Feb. 3, 1953 — J. F. QUEREAU ET AL — 2,627,182

ASPIRATION PYROMETER

Filed Dec. 14, 1949 — 2 SHEETS—SHEET 1

INVENTORS
John F. Quereau
Albert B. Teague
BY
Woodcock and Phelan
their attorneys.

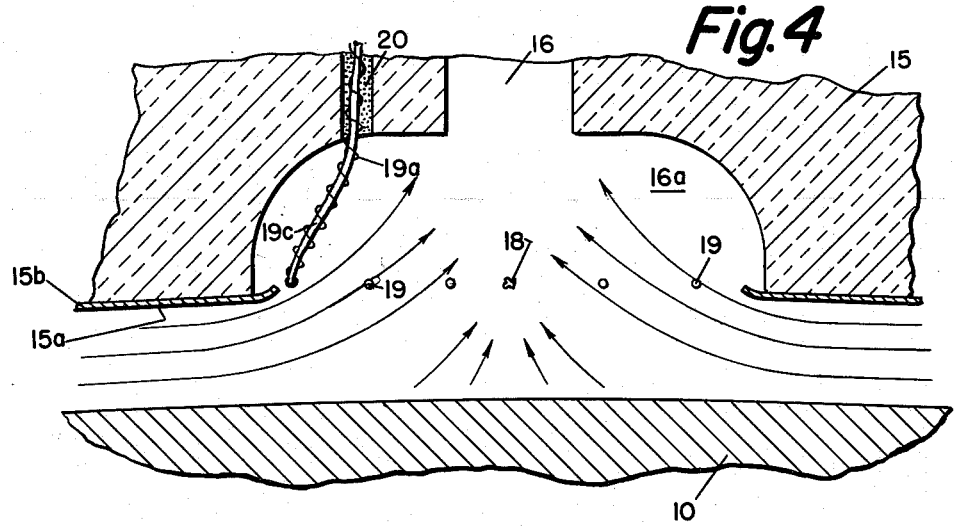
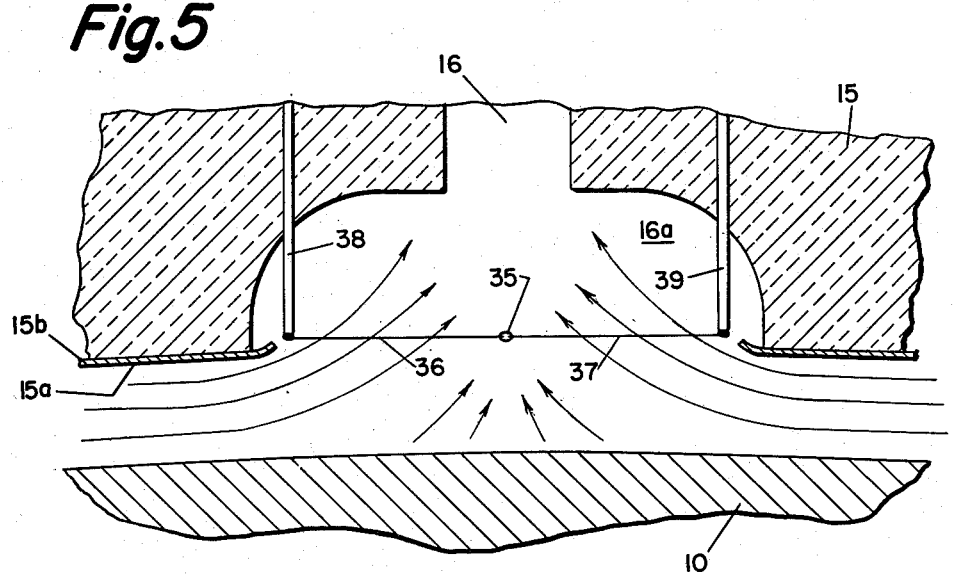
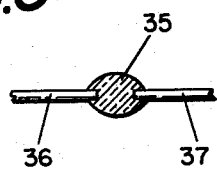

Patented Feb. 3, 1953

2,627,182

UNITED STATES PATENT OFFICE 2,627,182

ASPIRATION PYROMETER

John F. Quereau, Wyncote, and Albert B. Teague, Somerton, Pa., assignors to Leeds and Northrup Company, Philadelphia, Pa., a corporation of Pennsylvania Application December 14, 1949, Serial No. 132,866

7 Claims. (Cl. 73—351)

This invention relates generally to temperature measurement and it relates particularly to aspiration pyrometry and to the measurement of the temperature of the surface of moving objects.

It heretofore has been recognized that the temperature of certain moving objects, such as heated rolls used in the manufacture of paper or of rubber products, can be measured advantageously by aspiration of air from the roll surface to a thermometer. Many shortcomings of this type of measurement have also been recognized, and it has been proposed in U. S. Patent No. 1,758,532 to provide a heat-insulated hood adjacent the roll surface and to place a thermometer bulb in a pocket formed in this hood with the intention that the air surrounding the thermometer bulb would be heated as nearly as possible to the roll temperature. Since heat flow is from the roll to the thermometer bulb the temperature of the latter can never quite equal the temperature of the roll, and this temperature difference must be known in order to calibrate the thermometer in terms of roll temperature.

The ultimate object of the present invention is to determine accurately the temperature of a moving surface such, for example, as a roll surface. Inasmuch as experience has shown that in general the temperature difference between the moving surface and the pyrometric element cannot be known with great accuracy because of the unavoidable fluctuation of a number of factors that give rise to the temperature difference, it is desired to minimize the resultant errors by minimizing the temperature difference. Therefore a direct object of the invention is to maintain a stationary pyrometric element as nearly as possible at the same temperature as that of the moving surface whose temperature is being measured.

It is recognized that, in accordance with the invention, the maintenance of a pyrometer element at the exact temperature of the moving surface necessarily is a goal that is approached closely, although never quite achieved. It is therefore desired that the remaining temperature difference be susceptible of accurate determination in order that the temperature measuring apparatus may be given an accurate and unvarying calibration. This object of the invention is achieved, in one respect, by making both the heat supply to and the losses from the pyrometric element, and therefore its temperature, a definite function of the temperature of the moving surface.

Objectionable errors have occurred heretofore in attempting to measure the temperature of moving surfaces with aspiration pyrometric apparatus due to three closely related causes. First, heat dissipation from the stationary thermometer bulb has been so great that it has not been possible to transfer enough heat from the moving surface to the thermometer bulb to maintain the latter at a sufficiently close approximation to the temperature of the surface.

Second, as shown and described in the aforesaid Patent No. 1,758,532, the preferred position of the thermometer bulb has been as far removed from the roll surface as possible in the aforesaid pocket in the hood adjacent the roll. Furthermore, some portions of the air reaching the thermometer come directly from contact with the hood rather than the roll. Thus the thermometer bulb and the structure which surrounds and supports it unavoidably dissipate heat at a substantial rate. It is as if the temperature of the walls of the pocket were being measured, instead of the roll temperature, since the thermometer is more closely connected thermally to the walls than to the roll.

Third, there has been a failure to appreciate the necessity of transferring relatively large amounts of heat from the roll surface to the heat-dissipating environment of the thermometer bulb. For example, the stated purpose of the suction fan in the above-mentioned Patent No. 1,758,532 is merely to serve as an auxiliary to aid the natural circulation due to the roll movement of air in the pocket in which the thermometer is placed, whereas applicant prefers a velocity of aspirated air many times the velocity of the roll surface.

In accordance with the invention, and as an object thereof, the structure supporting and surrounding a pyrometric element is heated approximately to the temperature being measured by aspirating air from both the face of a stationary block and from the moving surface and directing it at high velocity in heating relation with the stationary structure. The predominant consideration in fixing this velocity is the transfer of heat at an adequate rate to supply the heat losses to the stationary structure to maintain it at approximately the temperature of the moving surface to reduce heat dissipation from the pyrometric element. As mentioned, the velocity of this air in some cases may exceed the optimum velocity for maintaining the air emperaure as nearly as possible the same as that of the moving surface.

In accordance with the present invention the temperature measurement is readily accomplished by means of a pyrometric element that is thermally isolated so that little transfer of heat thereto from the moving surface is required to maintain the element substantially at the temperature of the moving surface, and this heat transfer is accomplished by placing the pyrometric element substantially out of the path of the high velocity air and as close as possible to the moving surface for the dual purpose of heating it as much as possible by radiation from the moving surface and also by relatively slow-moving air that has been in contact with only the moving surface for a relatively long time and which is at approximately its temperature, having just left that surface.

The accuracy of temperature measurement with pyrometric elements, such as thermocouples, is adversely affected if their leads or supports conduct away from the element substantial quantities of heat. In accordance with the invention, and as an object thereof, conductive losses due to leads or supports are minimized or avoided by supplemental heating accomplished positively and definitely by passing the above-mentioned high-velocity air from the moving surface to and around the leads or supports, which may be specially lengthened in the path of the high-velocity air to reduce the heat loss by conduction therealong.

Although, as mentioned, the temperature of the aforesaid high-velocity air differs from that of the roll or other moving surface by an amount that is too great for satisfactory measuring purposes by direct application thereof to a thermocouple, it has, in accordance with the present invention, been utilized to maintain the temperature of the leads or other structure surrounding the thermocouple at a temperature so near that of the roll surface as to permit very little loss of heat from the thermocouple. The added heat suffices to supply the conduction, convection, and radiation losses of the thermocouple to maintain it substantially at the temperature of the roll surface. Whatever temperature difference may exist between the thermocouple and the roll surface will be definite in nature because the temperature of the thermocouple environment automatically follows in a predetermined relation any variations in the temperature of the roll surface, and therefore the thermocouple may be calibrated with great accuracy in terms of roll surface temperature.

Other objects and advantages of the invention will be apparent from the following more detailed description thereof with reference to the accompanying drawings, in which:

Fig. 4 is an enlarged diagrammatic sectional view of a portion of the structure shown in Fig. 2;

Fig. 5 is an enlarged diagrammatic sectional view of a modification of the structure shown in Fig. 4; and Fig. 6 is a detailed vertical sectional view of a portion of the structure shown in Fig. 5.

Figure 1:
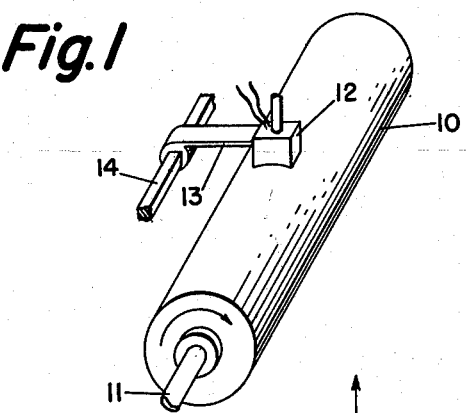
Fig. 1 is a small-scale perspective view of apparatus embodying the invention.

Referring to the drawings, the invention in one form has been shown as applied to the measurement of the temperature of a roll 10 rotating about the axis of its shaft 11. The roll may be heated by any suitable means, such as electrical resistors, steam, or by material passing in contact therewith. The attachment of thermocouples to such a roll for measuring the temperature thereof has not been successful due to varying contact potentials in the slip rings that necessarily have been employed for making connection with the thermocouple. Other temperature-measuring schemes have been unsatisfactory for various reasons, some of which are explained in the aforesaid Patent No. 1,758,532.

In accordance with the present invention, an aspiration pyrometer 12 is supported by an arm 13 attached to frame member 14 with the lower face of the pyrometer in close juxtaposition with the roll 10. By close juxtaposition is meant the closest spacing that may reasonably be employed considering possible eccentricity and irregularity of the surface of the roll, ordinary bearing play, unavoidable vibration of the pyrometer, and its inherent fragility. As best shown in the fragmentary view of Fig. 2, the aspiration pyrometer 12 comprises a block 15 having a suction duct 16 extending therethrough with an open mouth thereof facing toward the surface of the roll 10. A conduit 16b is flow connected with the duct 16 and leads to any suitable vacuum pump, or the like, for applying suction to the duct 16.

In a preferred form of the invention, the mouth of the duct is enlarged, that is to say, there is provided a shallow recess 16a about the mouth of the duct for flow of air from between the surface of roll 10 and the adjacent face 15a of block 15 into the recess adjacent the periphery thereof. The face 15a of block 15 conforms generally in shape with the surface of the roll 10 and preferably includes a thin metal face plate 15b having an opening coextensive with the recess 16a.

Figure 3:
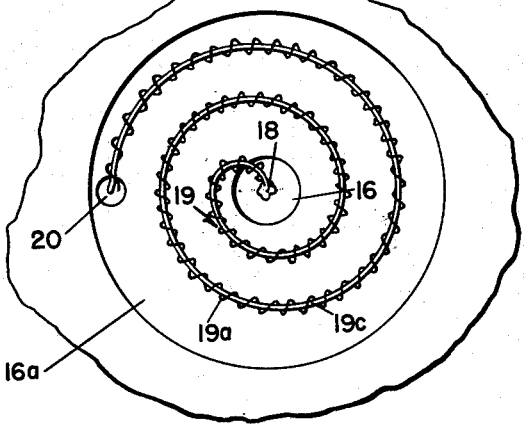
Fig. 3 is an enlarged fragmentary view taken along the line 3—3 in Fig. 2.

Disposed within the recess 16a is a temperature-sensitive element comprising the hot junction 18 of a thermocouple wholly supported by leads 19. As is best shown in Fig. 3, the hot junction 18 is located centrally of the enlarged mouth or cavity 16a and is inwardly spaced from the high-velocity peripheral flow of air through the cavity and into the suction duct 16. The recess 16a may be circular in shape and leads 19 are wound into a spiral of several turns. This thermocouple, comprising two dissimilar leads 19 suitably joined at junction 18, may be formed of any of the several suitable materials known to those skilled in the art.

Where the thermocouple materials are copper-constantan, the copper is preferably a fine wire, that is, of small cross-sectional area to minimize conduction of heat thereby. On the other hand, the constantan may be of much greater diameter, since it is a poor heat conductor, and in any event, both wires forming the thermocouple material should be of adequate diameter and strength to support the spiral in cantilever fashion from the portions of the conductors which extend upwardly into bore 20 in the block. The conductors may be cemented within bore 20 or otherwise secured to the block 15. The conductors may be terminated at their outer ends at the binding posts 23 and 24 for connection to other lead wires from any one of selected measuring instruments usually used with thermocouples, such an instrument being omitted from the drawings for the sake of clarity.

In Fig. 3 the fine copper wire 19a is shown wound around the heavier constantan wire 19c. Where the conductor materials are Chromel-Alumel, either conductor may be wound about the other or they may be twisted together and then shaped into the spiral. An additional advantage of the arrangement illustrated in Fig. 3 is that the twisting or winding of one thermocouple lead about the other provides good heat transference between them and air flowing past them.

Reference will now be had to Fig. 4 where the invention has been illustrated diagrammatically with the spacing between the aspiration pyrometer 12 and the roll 10 exaggerated somewhat in order to provide adequate room for the arrows indicating the general path of flow of air from between the face 15a of block 15 and the surface of the roll 10. With suction applied to the duct 16 it will be understood that air will flow inwardly in heat-exchanging relation both with the face 15a and with the surface of roll 10. This air will tend to be heated thereby to a temperature intermediate that of the face and the roll and it will approximate, through it never will reach, the temperature of the surface of roll 10.

The spacing between the face 15a and the surface of the roll 10 is very close, preferably close enough to insure a higher velocity of air between the juxtaposed surfaces than in the region of the spiral leads 19 and within the recess 16a. Although some turbulence occurs, the arrows in Figs. 4 and 5 indicate the path of flow of air in a general way within the flow passage. It is apparent that the larger volume of air flows at high velocity across and in heat-exchanging relation with the outer spiral leads 19 rather than in the central region of recess 16a around the hot junction 18 or other pyrometric element, and that air reaching junction 18 will have come directly from the surface whose temperature is to be measured.

As mentioned, near the periphery of recess 16a the velocity of the inwardly flowing air is higher than within the central region thereof. Where the velocity of air is higher there is a region of somewhat lower pressure in accordance with the well-known Bernoulli theorem. This large volume of high-velocity air is utilized to heat the heat-dissipating environment of the thermocouple including the leads supporting the hot junction 18 which is located in spaced relation, inwardly of the peripheral flow of the high-velocity air and in a low-pressure, thermally-guarded region subject to a temperature more nearly approximating that of roll 10.

Hot junction 18 advantageously may be placed in this region of low-pressure, low-velocity air because it requires very little heat to maintain it substantially at the temperature of the roll due to the supplemental heating of its environment by the high-velocity air. Stated differently, there is aspiration of air at lower velocity directly from the moving surface substantially below or opposite the hot junction 18, while the high-velocity air although effective in heating the leads, has relatively little effect upon the hot junction.

By heating the leads to approximately the temperature of the roll 10 there is avoidance of any consequential error in the temperature measurement due to loss of heat from the hot junction due to conduction along the leads. The heat that otherwise would flow to the outside from the thermocouple is, in accordance with the invention, supplied by the high-velocity air. There is likewise avoidance of error due to radiation losses from the thermocouple since the heat loss that would otherwise occur is prevented or reduced by heating the structure surrounding the thermocouple.

Figure 2:
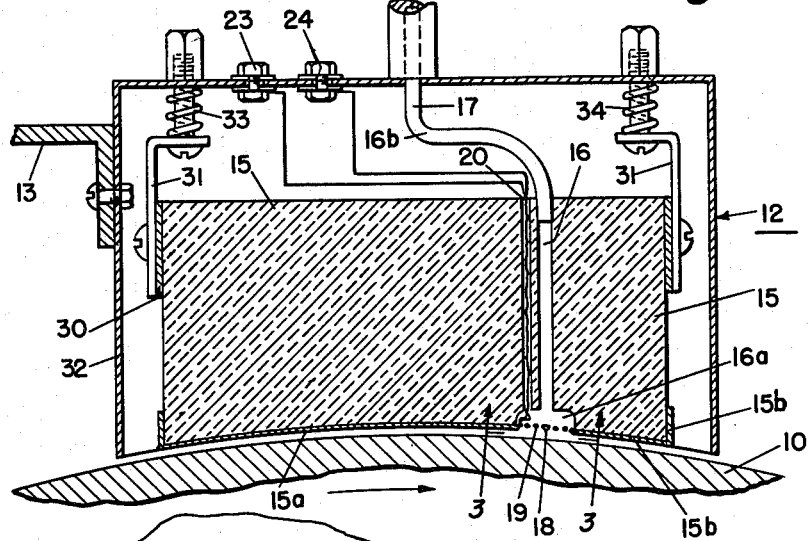
Fig. 2 is a fragmentary vertical sectional view of the structure shown in Fig. 1.

In the foregoing description it has been tacitly assumed that the velocity of the air flowing between the face 15a and the surface 10 is high relative to the speed of the surface of the roll 10. Even so, there will be some drag effect exerted upon the air by the roll 10 and it may be anticipated that there will be a somewhat greater flow of air in the direction of roll movement than in the opposite direction. Therefore, recess 16a preferably is located nearer the forward edge of block 15, that is, nearer the edge away from which roll 10 rotates, as shown in Fig. 2. Thus, the flow of air toward duct 16 is about equal from all directions and the above-mentioned region of low air velocity in recess 16a occurs about centrally of the recess.

However, if the speed of roll 10 is unusually high compared to the velocity of the air due to the aspiration thereof, it may be desirable in some cases to locate the hot junction 18 in an off-center position from that shown in Figs. 2, 4 and 5, and displaced in the direction of rotation of roll 10 in order that the hot junction shall be within the thermally-guarded region in which air is aspirated directly from the surface of the roll and in substantial avoidance of the high-velocity air from between the surface 15a and the surface of the roll 10.

In one form of the invention the block 15 was formed of heat-insulating glass such as compressed glass wool or such as sold under the name of "Foamglas," but other heat-insulating materials also may be used. Since "Foamglas" is to some extent friable, it is desirable to provide the thin metal face plate 15b thereon and also to utilize a clamping member 30 from which bracket 31 may extend resiliently to support the block 15 from an enclosing shroud 32 also of sheet metal and supported by arm 13 from frame member 14.

The aforesaid resilient means may comprise springs 33 and 34 which permit block 15 to yield without damage thereto in the event foreign material should come beneath the face 15a. In a preferred embodiment of the invention the recess 16a had a diameter of approximately one-quarter inch with the suction duct 16 about one-eighth inch in diameter. A spacing between the face 15a and the surface of roll 10 of about 3/64 inch has been found to be satisfactory although, of course, it could be less. With the foregoing dimensions and with a block of about four inches in diameter the suction applied was adequate for a flow of about four cubic feet of air per minute through duct 16.

It has also been found that by utilizing the foregoing features of the invention rapid response to temperature change is attained. For example, if there be a sudden change of temperature the thermocouple may in five seconds attain 85% of its final voltage output and it will require only about four minutes to reach 99% of its final value, speeds of responses greatly exceeding arrangements which have heretofore been proposed.

Thus far in this specification reference has been made to the measurement of the temperature of a roll provided with heating means. It is to be understood that in both the specification and in the claims the term "aspiration pyrometer" is intended to be generic for the measurement of the temperature of a roll whether provided with heating means or cooling means, and that where reference is made to heating of the leads or of the hot junction that the application thereto of the air from the surface of the roll 10 shall be included whether it be at lower temperature or at higher temperature than that of the ambient atmosphere. In other words, insofar as the invention is concerned, "cooling" is merely a negative form of "heating" that has been omitted for brevity and clearness.

While a preferred form of the invention has been described, it is to be understood the invention is not limited thereto and that many changes may be made within the scope of the appended claims. For example, while the spiral disposition of the leads within the circular recess 16a has been shown to be desirable for a number of reasons it is not essential that spiral leads be utilized. While the twisted ends lengthen the leads and thus increase the thermal resistance to the flow of heat by conduction, where the leads themselves have high thermal resistance they need not be in twisted form.

For example, in Fig. 5 the temperature-responsive element 35 may be in the form of a temperature-sensitive conducting material such as that known to those skilled in the art under the trade name "Thermistor." The element-engaging portion of the supporting means for the thermistor 35 comprises two members of small cross section, such as wires 36 and 37, forming the leads for the thermistor 35 and secured to terminal posts 38 and 39, it being understood that members 36 and 37 are rigid or taut between the posts 38 and 39. Particularly in the modification shown in Fig. 5 the recess 16a need not be circular but may be of rectangular shape. It is to be further understood that more than a pair of wires or members 36 and 37 may extend between the posts 38 and 39 in supporting relation with the temperature-sensitive element 35.

What is claimed is:

1. An aspiration pyrometer comprising a block having one face thereof conforming generally in shape to the surface of a rotating body whose temperature is to be measured for disposition in close juxtaposition therewith, said block having a suction duct extending therethrough with the mouth thereof facing toward said surface for inward flow of air adjacent the periphery of said mouth from between said surface and said face, a thermocouple having leads forming a spiral with a hot junction substantially at the center thereof, and means supporting said thermocouple and spiral leads substantially in the plane of said face with said hot junction located centrally of said mouth and inwardly spaced from said flow of air adjacent said peripheral of said mouth.

2. An aspiration pyrometer comprising a block having one face thereof conforming generally in shape to the surface of a rotating body whose temperature is to be measured for disposition in close juxtaposition therewith, said block having a suction duct extending therethrough with a mouth thereof facing toward said surface for inward flow of air adjacent the periphery of said mouth from between said surface and said face, a thermocouple having leads forming a spiral with a hot junction substantially at the center thereof, means supporting said thermocouple and spiral leads substantially in the plane of said face with said hot junction located centrally of said mouth and inwardly spaced from said flow of air adjacent said periphery of said mouth, said supporting means comprising extensions from said spiral of said thermocouple leads anchored to said block, outer portions of said spiral being disposed within and heated by said flow of air, said hot junction being disposed in a thermally guarded region subject to a temperature most nearly approximating that of said body.

3. An aspiration pyrometer comprising a block having one face thereof conforming generally in shape to a rotating body whose temperature is to be measured for disposition in close juxtaposition therewith, said block having a suction duct extending therethrough with a mouth thereof facing toward said surface for inward flow of air adjacent the periphery of said mouth from between said surface and said face, a thermocouple having leads forming a spiral with a hot junction at the center thereof, means supporting said thermocouple and its spiral leads substantially in the plane of said surface with said hot junction located centrally of said mouth and inwardly spaced from said flow of air adjacent said periphery of said mouth, said mouth being enlarged in the vicinity of said spiral to form a shallow recess of cross-sectional area somewhat larger than the area occupied by said spiral and providing a flow path for said flow of air in avoidance of said hot junction, outer portions of said spiral being disposed within and heated by said flow of air, said hot junction being disposed in a thermally guarded region subject to a temperature most nearly approximating that of said body.

4. An aspiration pyrometer for measuring the temperature of a moving surface comprising a stationary block conforming generally in shape to a portion of said surface and adapted to be positioned in close juxtaposition therewith, said block having a duct intermediate the edges thereof terminating in an enlarged open mouth opening toward said surface when thus positioned, means for drawing a stream of air inwardly between said surface and said block and through said duct at a velocity sufficiently great so that a central portion of said air stream adjacent said surface at said mouth of said duct is aspirated thereto substantially wholly directly from contact with said surface and an outer portion of said air stream at said mouth of said duct is aspirated thereto in part directly from contact with said surface and in part directly from contact with said block, a pyrometric element positioned in said mouth and thermally exposed to said central portion of said air stream for measuring said temperature of said surface, said element having within said central portion of said air stream a temperature-sensitive portion of small length and breadth as compared with the size of said open mouth, and elongated supporting structure for said element of length at least equal to the greatest width of said mouth, the major pportion of said elongated structure being thermally exposed to said outer portion of said air stream whereby heating of said elongated supporting structure nearly to the temperature of said temperature-sensitive portion of said element reduces heat dissipation therefrom to improve the accuracy of said measurement, and both said temperature-sensitive portion and said supporting structure of said pyrometric element being disposed in a radial plane adjacent the entrance to said mouth of said duct.

5. An aspiration pyrometer for measuring the temperature of a moving surface comprising a stationary block conforming generally in shape to a section of said surface and adapted to be positioned in close juxtaposition therewith, said block having a duct intermediate the edges thereof opening toward said surface when thus positioned, means for drawing a stream of air inwardly between said surface and said block and though said duct at a velocity sufficient to cause a central portion of said air stream adjacent said surface at the entrance of said duct to be aspirated thereto substantially wholly directly from contact with said surface and an outer portion of said air stream at the entrance of said duct to be aspirated thereto in part directly from contact with said surface and in part directly from contact with said block, a pyrometric element in the entrance to said duct positioned in and thermally exposed to said central portion of said air stream and having an electrical characteristic which varies with change of said temperature of said surface, and means responsive to change of said electrical characteristic for measuring said temperature of said surface including electrical leads operatively connected to and wholly supporting said element, the major portions of the lengths of said leads being traversed by and thermally exposed to said outer portion of said air stream, said lengths being great compared with the largest dimension of the temperature-sensitive area of said pyrometric element and at least as great in length as the width of the entrance of said duct whereby heating of said leads nearly to the temperature of said element reduces heat dissipation therefrom to improve the accuracy of said measurement, said supporting structure being disposed in a radial plane adjacent the entrance to the duct and in juxtaposition to said surface.

6. An aspiration pyrometer comprising a block having one face thereof conforming generally in shape to a rotating body whose temperature is to be measured for disposition in close juxtaposition to the surface of said body, said block having a suction duct extending therethrough with a mouth thereof facing toward said surface for inward flow of air adjacent the periphery of said mouth from between said surface and said face, a thermocouple having a hot junction and a cold junction, means supporting the hot junction of said thermocouple substantially in the plane of said face and centrally of said mouth and inwardly spaced from said flow of air adjacent said periphery of said mouth, said supporting means including the leads of said thermocouple, said leads being of materially greater length than a diameter of the largest portion of said mouth and disposed in a non-linear path between the hot junction and the supporting means, said mouth being enlarged in the vicinity of the non-linear path of said leads to form a small recess of cross-sectional area somewhat larger than the area occasioned by the hot junction and the non-linear path of said leads and providing a flow path for said flow of air in avoidance of said hot junction and in heating relation with the non-linear disposition of said leads, said hot junction thereby being disposed in a thermally guarded region subject to a temperature most nearly approximating that of said body.

7. An aspiration pyrometer for measuring the temperature of a moving surface comprising a stationary block conforming generally in shape to a portion of said surface and adapted to be positioned in close juxtaposition therewith, said block having a duct intermediate the edges thereof opening toward said surface when said block is thus positioned, means for drawing a stream of air inwardly between said surface and said block and through said duct, said block at the mouth of said duct being shaped so that a central portion of said air stream adjacent said surface at the mouth of said duct is aspirated therein substantially wholly directly from contact with said surface and an outer portion of said air stream of said duct is aspirated therein in part directly from contact with said surface and in part directly from contact with said block, a thermocouple positioned in said mouth and having its hot junction spaced from the inner peripheral surface of said mouth whereby said junction is thermally exposed to said central portion of said air stream for measuring the temperature of said surface, and supporting structure for said thermocouple including its leads, the leads thereof being disposed in a plane adjacent said mouth and being of substantial length and long enough to be contacted in a plurality of different zones by the outer portion of the air stream aspirated into said mouth whereby the heating of said supporting structure including said leads reduces loss of heat from said hot junction and thus maintains its temperature more nearly that of the air directly aspirated from said moving surface.

JOHN F. QUEREAU.
ALBERT B. TEAGUE.

REFERENCES CITED

The following references are of record in the file of this patent:

UNITED STATES PATENTS

| Number | Name | Date |
| --- | --- | --- |
| 1,758,532 | Phinney | May 13, 1930 |
| 1,883,444 | Albert | Oct. 18, 1932 |
| 2,480,703 | Bradner et al. | Aug. 30, 1949 |
| 2,508,205 | Whittaker | May 16, 1950 |

OTHER REFERENCES

Roeser et al.: "Measurement of Surface Temperatures," Research Paper No. 231, Bureau of Standards Journal of Research, vol. 5, October 1930, pages 794-797.